May 10, 1949. A. W. PAYNE 2,469,405
APPARATUS FOR BENDING TUBING INTO SERPENTINE
COILS AND SWEEP MECHANISM AND STOP THEREFOR
Filed May 14, 1947 7 Sheets-Sheet 1

INVENTOR.
Arthur W. Payne
BY
Barnes, Kisselle, Laughlin & Raisch
ATTORNEYS.

INVENTOR.
Arthur W. Payne
BY
Barnes Kisselle Laughlin & Raisch
ATTORNEYS.

INVENTOR.
Arthur W. Payne
BY
Barnes, Kisselle, Laughlin & Raisch
ATTORNEYS.

INVENTOR.
Arthur W. Payne

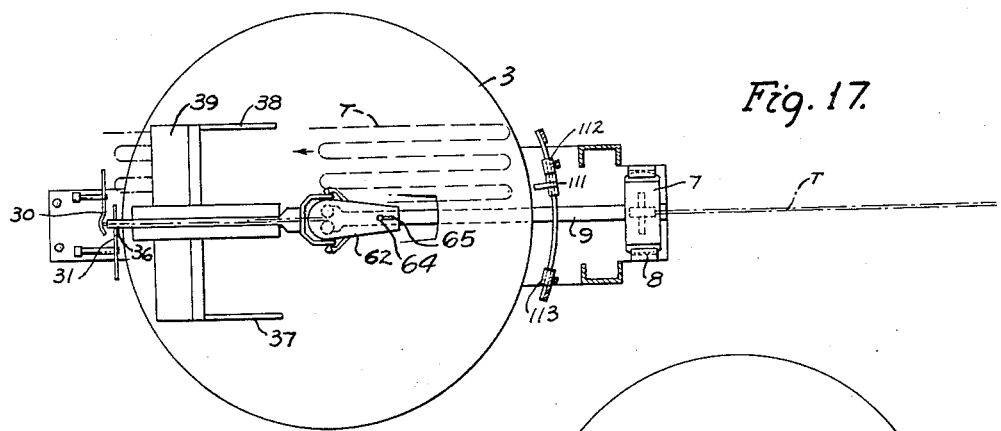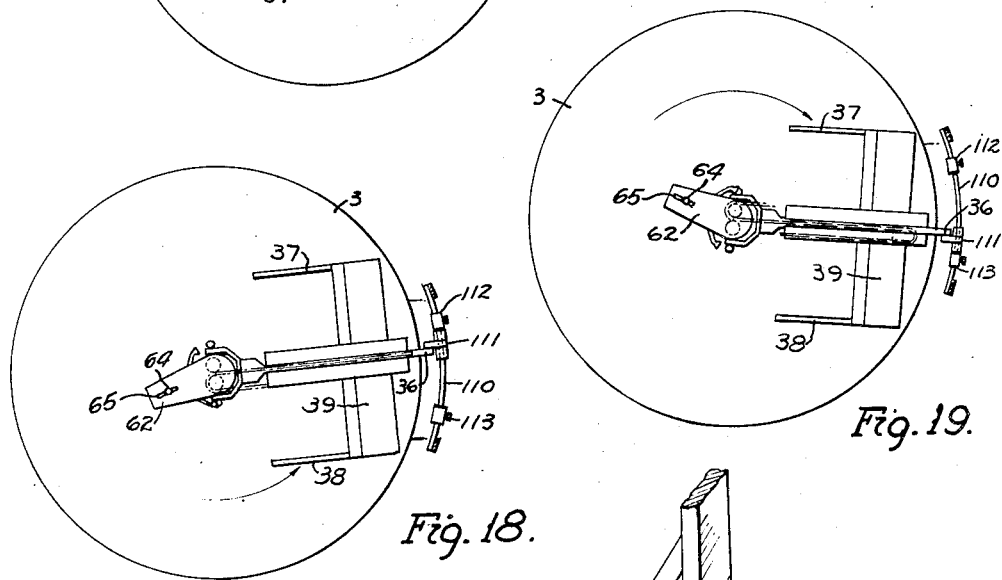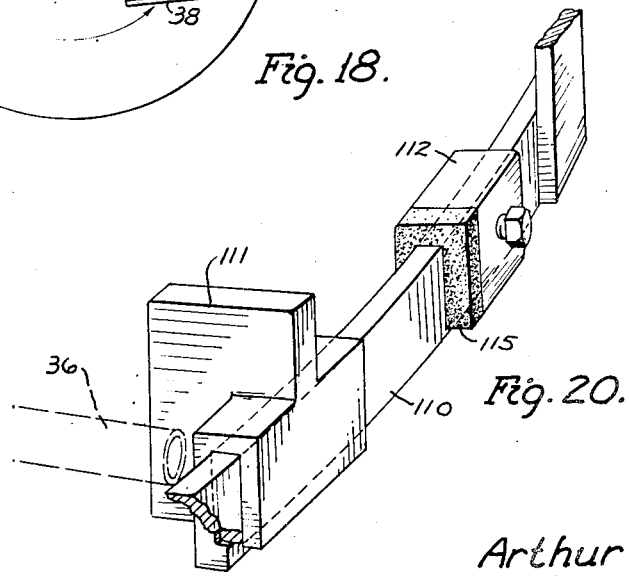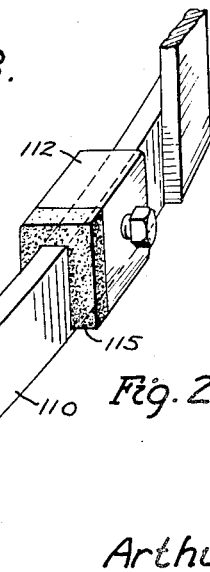

May 10, 1949.  A. W. PAYNE  2,469,405
APPARATUS FOR BENDING TUBING INTO SERPENTINE
COILS AND SWEEP MECHANISM AND STOP THEREFOR
Filed May 14, 1947  7 Sheets-Sheet 6

INVENTOR.
Arthur W. Payne
BY
Barnes, Kisselle, Laughlin & Raisch
ATTORNEY.

Patented May 10, 1949

2,469,405

UNITED STATES PATENT OFFICE 2,469,405

APPARATUS FOR BENDING TUBING INTO SERPENTINE COILS AND SWEEP MECHANISM AND STOP THEREFOR

Arthur W. Payne, Detroit, Mich., assignor to Bundy Tubing Company, Detroit, Mich., a corporation of Michigan Application May 14, 1947, Serial No. 748,019

14 Claims. (Cl. 153—46)

This invention relates to an apparatus for bending long work pieces, such as tubing, into coils of serpentine shape.

Long lengths of tubing fashioned into serpentine coil shape is capable of use in numerous installations for heat exchange purposes and, in fact, is so used as condensers for refrigerating apparatus. Where a relatively long length of tubing is formed into a serpentine coil, the operation is difficult and time consuming where the operation is performed by hand due to the fact that, as the operation progresses, the coil becomes larger and larger and must be moved or manipulated relative to the straight length of tubing to form the bends. Usually, the bends are about 180°.

In application Serial No. 687,668, filed August 1, 1946, and issued as Patent No. 2,454,290, on November 23, 1948, there is shown an apparatus for placing a series of substantially 180° bends in a length of tubing to provide a serpentine coil. In this apparatus, the coil, which is being formed, is moved through an angle of about 180° in one direction to form one bend, and then it is moved through an angle of about 180° in the opposite direction to form the next bend. It will be appreciated that in order to obtain a reasonable amount of speed in the operation and production of coils, that these swinging movements must be quite rapid and the coil must come to a stop after a bend is made, and it also must come to a stop in a position where the tube is fed forwardly between bends. In order to get any appreciable speed of operation, the rate of acceleration must be relatively high from a position at rest and the rate of deceleration must be rapid as the swinging tube comes to the stop position.

Now, where a relatively small coil is formed which has runs between the bends of not too great a length, and wherein the number of bends are not too great, and wherein the diameter of the tube is of generous proportions, the coil, as it is formed, may be strong enough to overcome these swinging movements with the accompanying rates of acceleration between the swinging movements. Where, however, a coil is formed with relatively long runs between the bends, or where the tube is particularly small in cross section, and thus rather flexible, or where a particularly large number of bends are made in the coil, or in any combination of these factors, the tubing in the coil is not strong enough to withstand these movements without becoming bent or distorted. To use what is perhaps homely language, the coil is whipped about from side to side and accelerated and stopped about every 180°, and if the movement is rapid in order to get adequate production, the coil simply is whipped out of shape or the coil or the tubing of the coil is bent.

The general object of the present invention is to provide an improved apparatus for bending the tube into serpentine coils and guiding and holding the coil as it is being formed to prevent it from being whipped out of shape. To this end, a guiding and moving mechanism is provided which engages and moves the coil in its reverse swinging movements and performs the functions of accelerating and decelerating the tube as it is moved from and to a position of stoppage. After a bend has been made, the tubing and, therefore, the portion of the coil formed must be advanced to provide a length of tubing for the next run of tube in the serpentine coil. Prior to this advancement, the coil guiding mechanism, or sweep as it may be called, is elevated from the work table upon which the coil rests so that it can move back to a position for receiving the advancing coil. Inasmuch as the bending rollers, which actually perform the bend in the tube, must have a movement before bending forces are applied to the tube, in order to get adequate leverage on the tube, a lost play arrangement is provided so that this essential movement is not imparted to the sweep mechanism. Moreover, in view of the fact that the metal of the tube has spring-back tendency, the actual bend must be somewhat more than 180° so that after the spring-back action, the bend is actually near 180°. To this end, the invention contemplates making such a bend and provides a novel over-center stop arrangement.

An apparatus constructed in accordance with the invention is shown in the accompanying drawings:

Fig. 17 is a diagrammatic plan view illustrating the serpentine coil on the work table with the sweep in position to receive the advancing coil.

Fig. 18 is a view similar to Fig. 17 showing the position of the sweep after a bend has been made and showing the over-center stop arrangement.

Fig. 19 is a view similar to Fig. 18 showing the sweep in the position after the making of the next succeeding bend.

Fig. 20 is a perspective view showing the stop mechanism.

Figure 1:
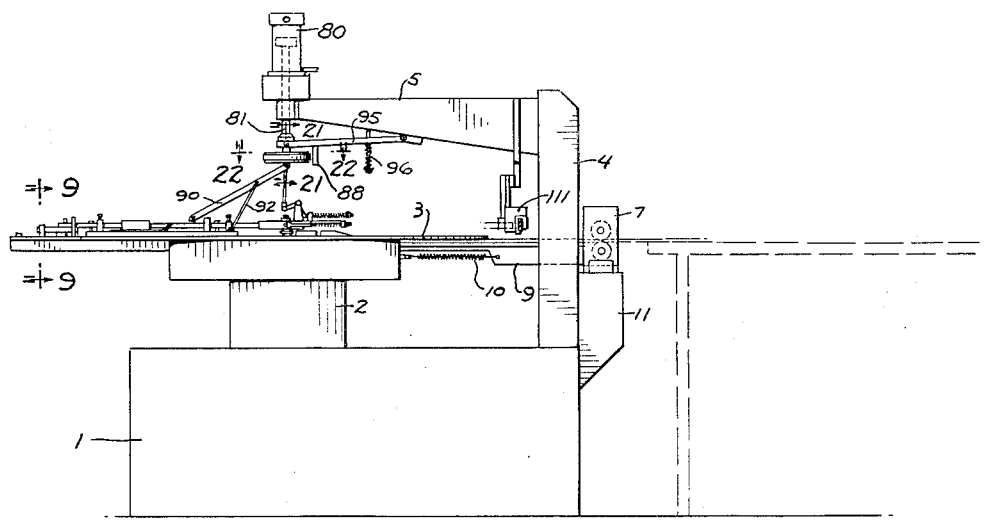
Fig. 1 is a general side view of the apparatus showing the frame structure and work table.
Figure 2:
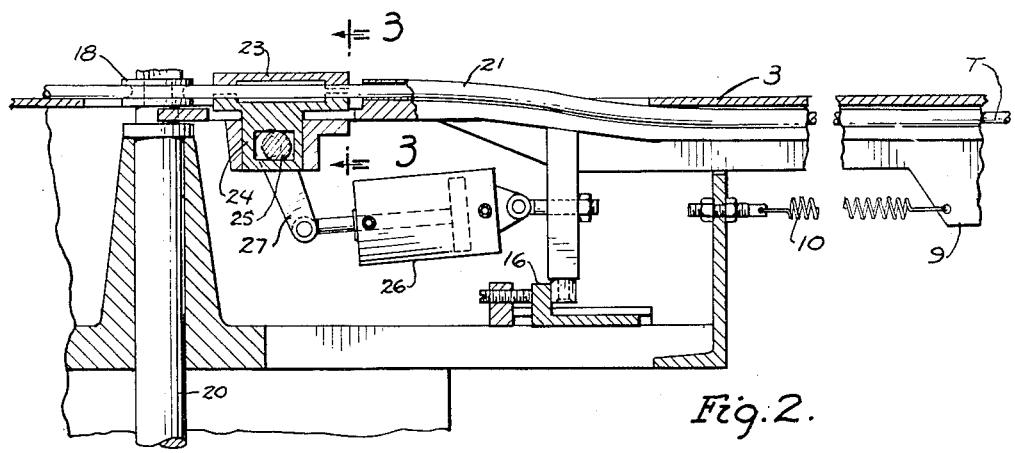
Fig. 2 is an enlarged sectional view taken through the bending head mechanism.
Figure 3:
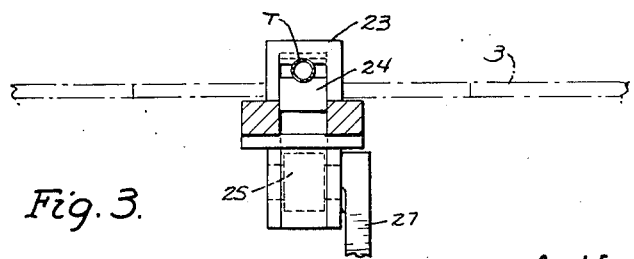
Fig. 3 is a sectional view taken substantially on line 3—3 of Fig. 2 showing the tube clamp.
Figure 4:
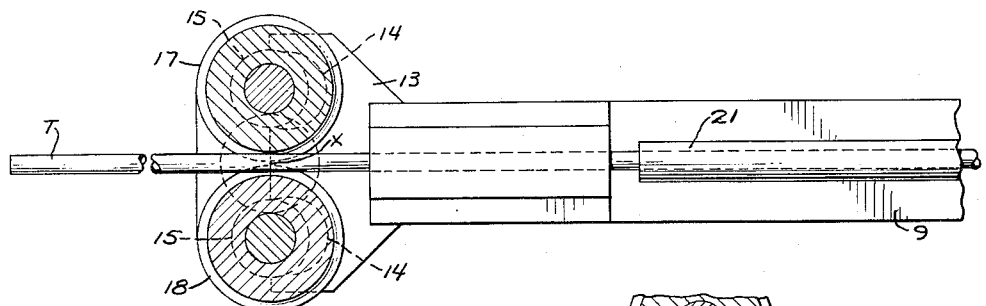
Fig. 4 is a somewhat diagrammatic view showing the position of the bending rolls in rest position.
Figure 6:
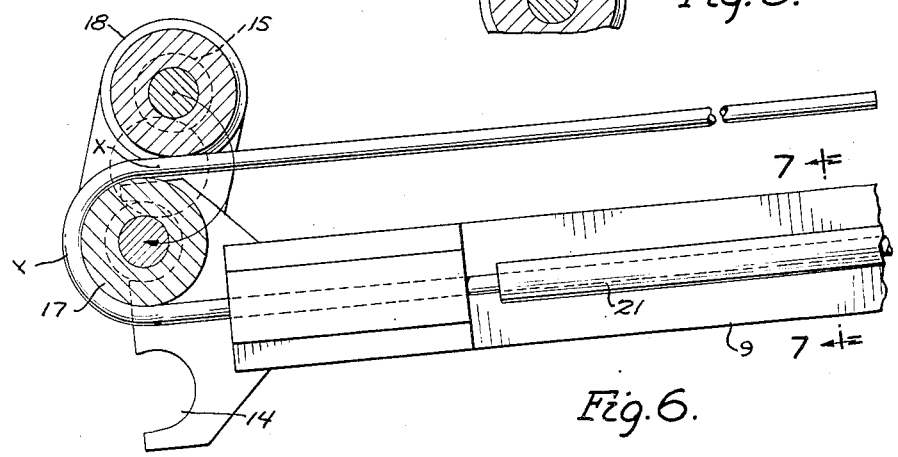
Fig. 6 is a view similar to Fig. 4 showing the completion of a bend.

As illustrated at Fig. 1, the machine comprises a base 1 with a suitable pedestal 2 for supporting a work table 3. A post 4 carries an overhanging arm 5. The apparatus, of course, involves the basic bending mechanism as disclosed and claimed in the above mentioned co-pending application, and, therefore, such mechanism will be but briefly described herein. The tube indicated at T (Fig. 2) is advanced by suitable driving rollers of a driving unit 7. This unit is mounted, as at 8 (Fig. 17), so that it can oscillate and reciprocate with the necessary movements of the bending rolls. Attached to the driving unit is a forwardly extending bar 9 acted on by a spring 10 which urges the arm and unit 7 forwardly against a stop 16, and thus the unit and arm may slide rearwardly with the unit sliding on a support 11. The forward end of the bar 9 has a fork-shaped head 13 which is notched, as shown at 14, for receiving bearing portions 15 of two bending rolls 17 and 18 (Figs. 4 and 6). The base of the machine carries a shaft 20 (Fig. 2) upon which the two rollers are mounted for oscillation about a center point at $x$ (Fig. 6). These two rolls are grooved, as shown, to receive the tube therebetween and the tube is fed to the rolls through a guide pipe 21. Mounted on the swinging bar 9 is a clamp 23 having a movable clamp member 24 which is actuated by a cam 25, in turn controlled by an air cylinder 26 with its piston rod connected to a crank arm 27. The axle for the cam is journalled in the body 23 of the clamp (Fig. 3) and it will be seen by reference to Fig. 2 that oscillation thereof will elevate the clamp 24 to thus grip the tube.

Figure 8:
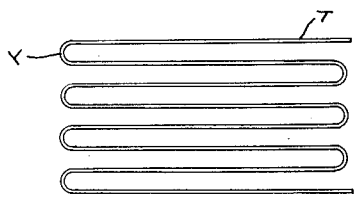
Fig. 8 is a view of a formed serpentine coil.
Figure 7:
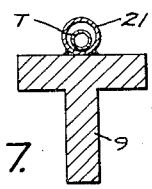
Fig. 7 is a cross sectional view taken substantially on line 7—7 of Fig. 6 showing the tube in its guide pipe.

To briefly describe the basic bending operation, it may be said that the tube is fed between the bending rollers 17 and 18 to a proper position and then the rollers, starting from the Fig. 4 position, are oscillated about the center $x$. The roller 18 functions as a forming roller to bend the tube, as at $y$, around the roller 17 when the shaft rocks clockwise as Fig. 4 is viewed. Inasmuch as the roller 17 seats in a notch in the head 13 in this action, the swing bar 9 and the driving unit 7 are pushed back against the action of the spring 10 and also oscillated to the position shown in Fig. 6. The rollers now move back to the starting or rest position as shown in Fig. 4. The tube is next advanced the desired distance. Now, the action of the rollers is reversed with the roller 17 serving as a forming roller to bend the tube around the roller 18 to provide another bend in the tube as the shaft 20 rocks counter-clockwise as Fig. 4 is viewed. The action is just the same as that shown in Fig. 6 but reversed. In this latter action, the roller 18 seats in the notch 14 in the head and the swing bar is caused to reciprocate and oscillate. During each bending action, the tube is clamped by the clamp members 23—24 and, of course, the clamp is opened up for the advancement of the tube subsequent to the making of a bend. After the second bend is made, the rollers are oscillated back to the starting position shown in Fig. 4, the clamp is released and the tube again advanced. This action continues until a coil is formed as shown in Fig. 8.

It is important to note that the tube passes between the groove rollers 17 and 18 with some clearance. As a result, the two rollers swing on their axis to a position demonstrated in Fig. 5, before the tube is actually engaged, and the bending action started. This is necessary in order to obtain adequate leverage on the tube.

Figure 9:
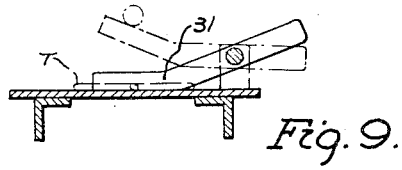
Fig. 9 is a view somewhat diagrammatic in nature showing a stop member and taken substantially on line 9—9 of Fig. 1.

Now, it will be appreciated that in this procedure, the coil undergoing formation must be oscillated back and forth as the bends are made. And the remaining mechanism is largely for the purpose of facilitating this oscillating movement of the coil while supporting the coil and preventing the same from being bent and distorted. Also, some of the remaining mechanism involves stop means for controlling the advancing movement of the tube. These are not shown in detail but, as diagrammatically illustrated in Fig. 17, one stop 30 is in the form of a switch arm of a microswitch against which the leading end of the tube abuts as it is advanced and actuation of the switch upon engagement by the end of the tube functions to stop the action of the rolls of the feeding unit. It will be seen by reference to Fig. 8 that the ends of the tube project slightly beyond the bends so there is a second switch arm 31 which functions to stop the feeding action when one of the bends strikes the same. This switch arm 31 is movable as shown in Fig. 9, so that it may drop into position for all stopping operations subsequent to the initial one when then end of the tube goes past the same to strike the switch arm 30.

Figure 10:
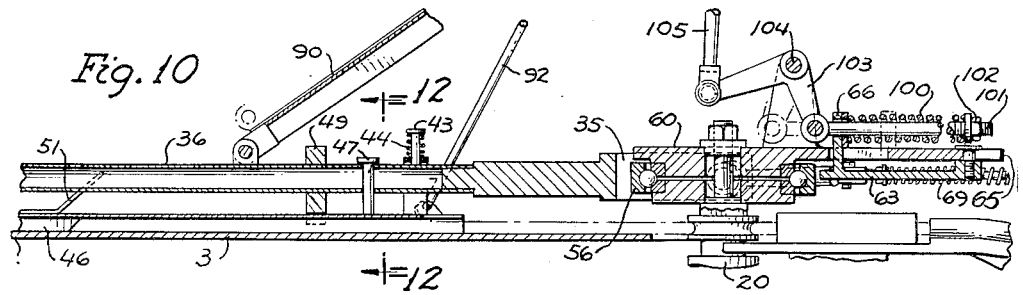
Fig. 10 is an enlarged cross sectional view taken through the sweep and operating means therefor.
Figure 11:
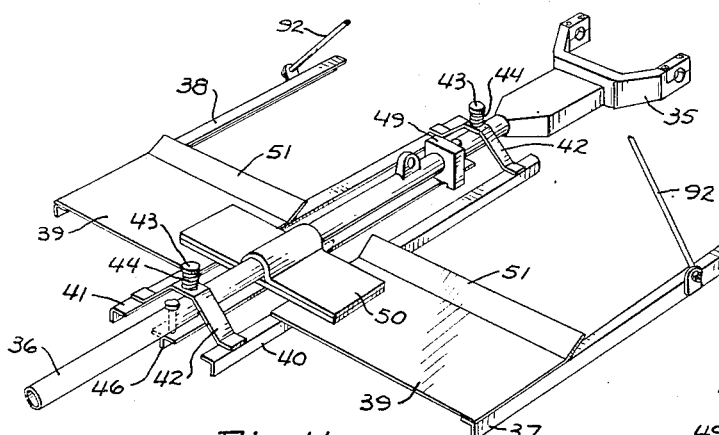
Fig. 11 is a perspective view of the sweep.

The sweep mechanism is illustrated in Figs. 10 and 11 and it comprises a mounting yoke 35 from which an arm 36 extends. Carried by the arm are sweep members shown as outer members 37 and 38 which may be angular in cross section supported by plates 39. The plates 39 are attached to inner angle sweep members 40 and 41 and these guides have yokes 42 which extend over and are mounted on the arm 36 by pins 43, there being a coil spring 44 on each pin. The springs 44 hold the yokes downwardly but allow the structure to flex upwardly relative to the arm 36.

A central guide member of T shape in cross section is illustrated at 46. This is carried by pins 47 which are loosely mounted in the arm 36 (Fig. 12) to permit the T member 46 to oscillate laterally within limits provided by a slot 48 in a block 49 mounted on the arm. A pair of plates 50 secured to the arm 36 may overlie and limit the upward movement of the plates 39. One edge of the plates 39 may be turned upwardly as at 51 for insuring passage of the sections of the coil underneath the plates.

Figure 14:
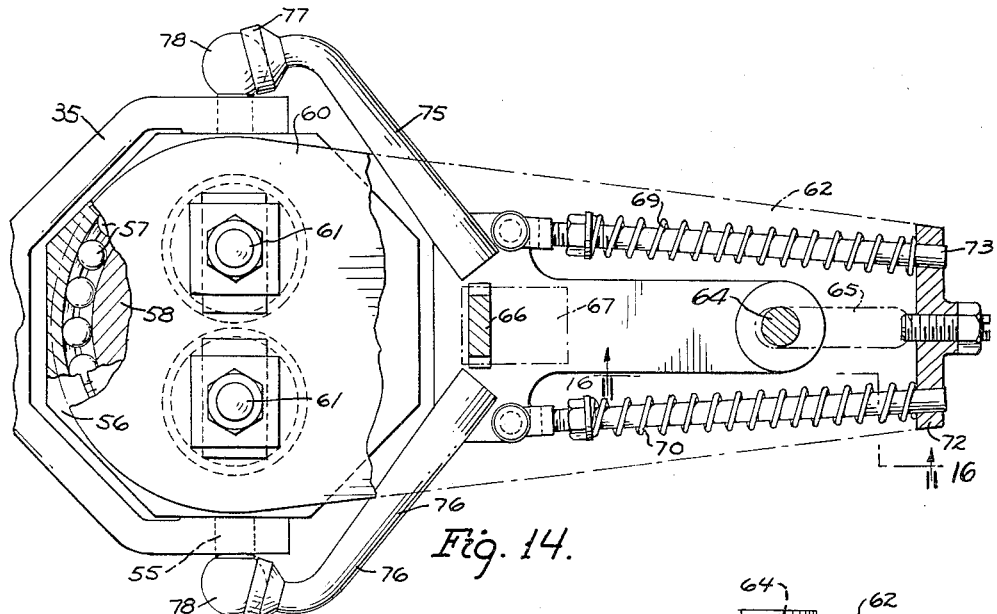
Fig. 14 is an enlarged view partly in section looking downwardly on the mechanism for oscillating the sweep and providing the lost play action.
Figure 16:
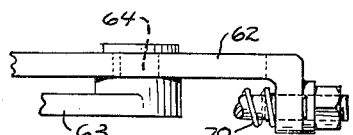
Fig. 16 is a view taken substantially on line 16—16 of Fig. 14 showing a slidable mounting for one of the oscillating members.
Figure 15:
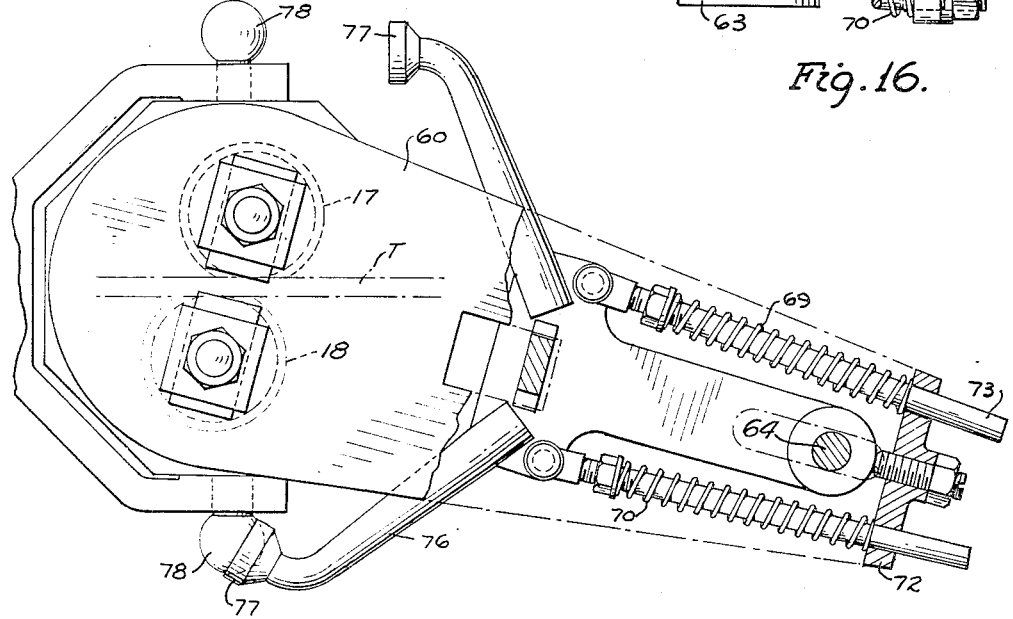
Fig. 15 is a view similar to Fig. 14 showing the function of providing the lost play action.

The mounting of the yoke is illustrated in Figs. 14 and 15, where it will be seen that the opposite arms of the yoke are mounted on pins as at 55 on an outer bearing race 56. Ball bearings 57 are disposed between the outer race and an inner race 58 which is mounted on a block 60 bolted in position as at 61 by the pins or bolts which extend through the rollers 17 and 18 of the oscillating bending head.

It will thus be seen that insofar as the structure described is concerned, the oscillation of the bending head is entirely independent of the sweep. To provide an operating connection between the oscillating bending head and the sweep, the plate 60 has an extending arm or tail piece 62 and mounted on the underside of the same is a shiftable member 63 having a pin 64 mounted in a slot 65 and having a projection 66 situated in a slot 67 of plate 60. A pair of springs 69 and 70 act on the slide member 63 to push it to the left as Fig. 14 is viewed, these springs reacting against the end of the tail piece 72 and each being mounted on a guide rod 73. The slide member 63 carries a pair of outwardly extending arms 75 and 76, each having a socketed end piece 77 for engagement with ball portions 78 of the pins 55.

The springs 69 and 70 are under compression and normally urge the slide member to the left as Fig. 14 is viewed with the sockets 77 in engagement with the balls 78. When the oscillating head starts to move, the inertia of the sweep loads the springs and they compress with the result that the slide member 63 slides to the right as Fig. 14 is viewed, thus allowing considerable angular movement of the bending head and the plate 60 before the arm 76 compressively urges the sweep into movement. This will be discussed more fully later. In the normal position, the parts are shown in Fig. 14, with both sockets 77 engaging the ball portions 78 thus holding the sweep in centralized or zero position as illustrated in Fig. 17.

Figure 21:
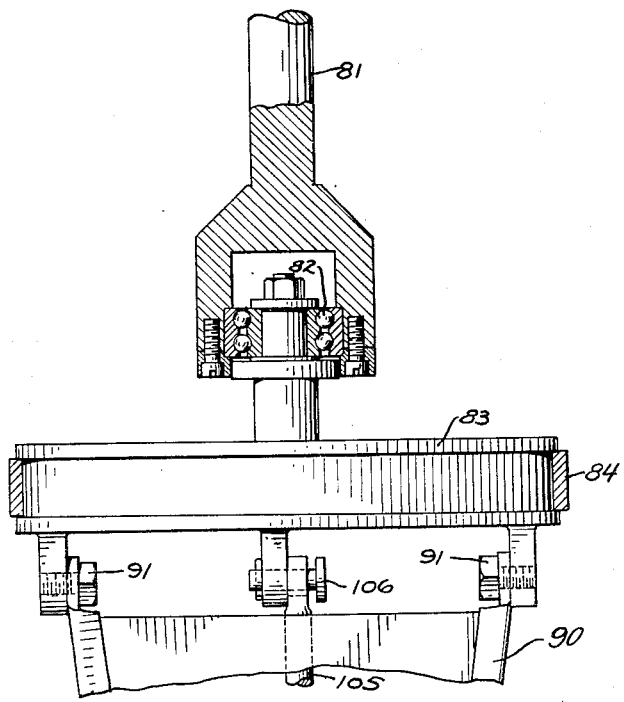
Fig. 21 is an enlarged cross sectional view taken substantially on line 21—21 of Fig. 1 showing operating means for the sweep.
Figure 22:
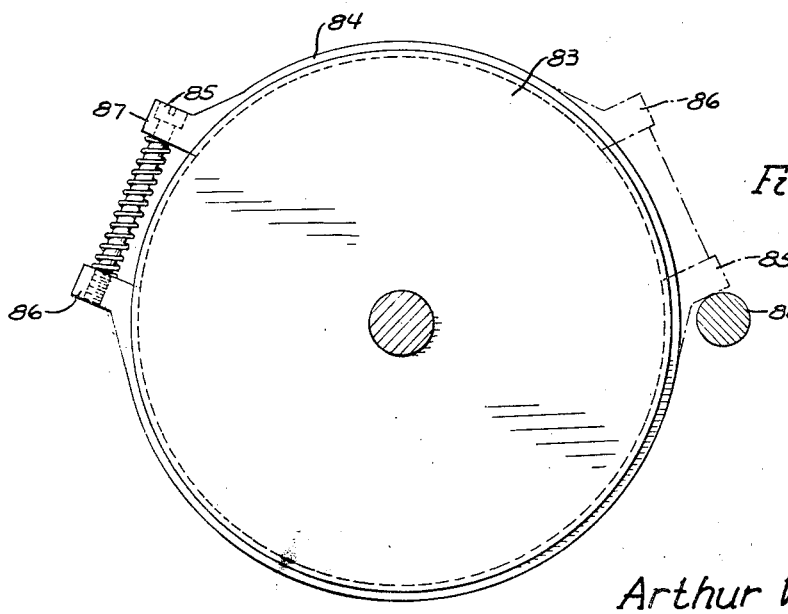
Fig. 22 is an enlarged sectional view taken substantially on line 22—22 of Fig. 1 showing a friction brake for decelerating the sweep.
Figure 23:
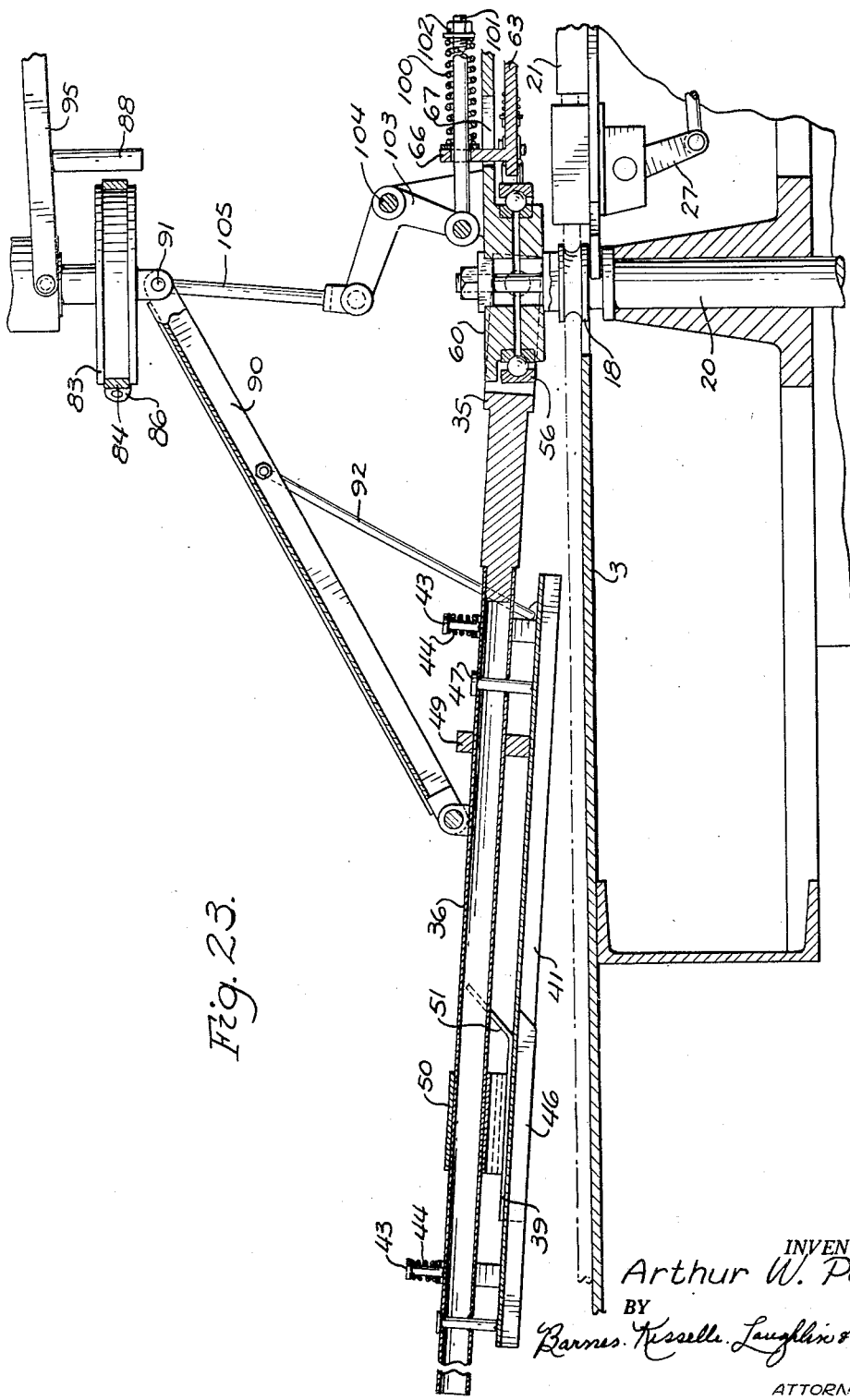
Fig. 23 is an enlarged view similar to Fig. 10, showing the sweep in elevated position.

The overhanging arm 5 carries an element, such as an air cylinder 80, which has a piston therein with a depending piston rod 81 (Fig. 21). Depending from the end of the piston rod through the means of a bearing, which is preferably an anti-friction bearing 82, is a disc member 83 which carries thereon and has applied tightly thereto a brake band 84, the tightness of which may be adjusted by screws 85 passing through lugs 86 and 87 with an interposed spring. There is a fixed stop 88 located near the disc member 83 to be engaged by the lugs 86 and 87. An angularly disposed brace 90 (Figs. 1 and 10) connects to the arm 36 and it is of widening construction and is connected to the underside of the disc 83 at spaced points 91. Side braces 92 connect the outer rail members 37 and 38 with the angle brace 90. Thus, the supporting arm 36 may be held in a proper position. It will be seen, however, that upon proper introduction of air into the cylinder 80 that the piston rod may be elevated from the position shown in Fig. 1, and this movement pivotally raises the arm 36 and all structure mounted thereon upwardly about the axis of the pins 55. Reversely, when the piston rod is urged downwardly the arm 36 is swung downwardly and the sweep members 37, 38, 40 and 41 strike the work table 3 and are urged yieldably thereagainst by the spring 44. A supporting or stabilizing link 95 (Fig. 1) may be employed to support the lower end of the piston rod and the downward movement may be cushioned by a spring 96. The link 95 may carry the fixed abutment 88.

Yieldable means is provided for the application of additional yielding action on the slide member 63 and this comprises one or more springs 100 (Fig. 10) mounted on a rod 101 provided with a reaction nut 102. The rod extends through the portion 66 so that the spring reacts on the portion 66 and the rod is connected to a bell crank 103 and pivoted as at 104 on the plate 60. Also connected to the bell crank is an actuator rod 105 which is connected as at 106 to the disc 83. With this construction, considering Figs. 1 and 10, it will be appreciated that when the sweep is elevated by reason of upward movement of the piston 81 that the bell crank 103 is oscillated to a position illustrated by the dotted line position shown in Fig. 10. This action compresses the spring or springs 100 and applies this additional pressure on the slide member 63. This increases the force with which the arms 75 and 76 engage the ball portions 78.

The overcontrol stop arrangement is illustrated in Figs. 17 to 20 inclusive, and it comprises an arcuate member 110 on which is mounted a slidable stop 111. Adjustably mounted on the arcuate member are fixed stops 112 and 113 which limit the sliding movement of the sliding stop 111. The fixed stops may be faced with a resilient facing material 115 which the sliding stop may strike. As the sweep swings counter-clockwise as Fig. 17 is viewed, the arm 36, as demonstrated in Fig. 18, strikes the sliding stop 111 and when the sliding stop abuts the fixed stop 112 the angular movement is positively stopped. It will be noted from considering Fig. 18 that the oscillatory movement has been somewhat in excess of 180°. When the sweep is swung clockwise as Fig. 17 is viewed, the arm 36 strikes the sliding stop 111 and the movement is ended when the sliding stop strikes the fixed stop 113. The adjustable nature of the fixed stops 112 and 113 provides for just enough overbending so that when the metal of the tube springs back to shape, a substantially accurate 180° bend is made in the stock.

Figure 5:
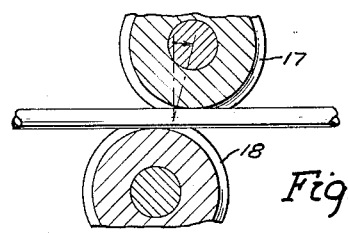
Fig. 5 is a view somewhat similar to Fig. 4 showing the amount of movement the rolls may take prior to the beginning of the bending action on the tube.

Some detailed operations of portions of the above described mechanism have already been set forth, but it is believed to be advisable to go through the general operation of the machine in order to co-relate the functions of the various elements. Figs. 1 and 17 show the normal or rest position. The tube is advanced by the driving unit until its leading end strikes the switch arm 30. The leading end of the tube will pass on one side of the T shape central guide. By means (not shown) the feeding movement is discontinued and the clamp 24 is applied. The bending head now starts to oscillate by means (not shown) and this may be a movement clockwise from the position of Fig. 4 to the position of Fig. 6. As this movement starts the bending rollers shift to a position as indicated in Fig. 5 before they actually take a purchase upon and begin to bend the tube and it is, during this movement, that the plate 60 moves from the position shown in Fig. 14 to the position shown in Fig. 15. This compresses the springs 69 and 70 without movement of the sweep due, at least in part, to the inertia of the sweep. However, as the parts arrive in a position as indicated in Fig. 15, the arm 76 forcibly engages the ball 78 and swings the sweep with the bending head to guide the leading end of the tube and to support the same and prevent it from whipping. This movement continues until the parts arrive at a position as diagrammatically illustrated in Fig. 19.

Figure 12:
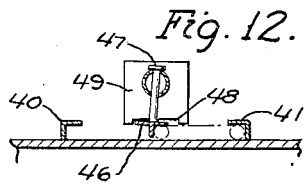
Fig. 12 is a sectional view taken substantially on line 12—12 of Fig. 10 showing some of the guiding means of the sweep.
Figure 13:
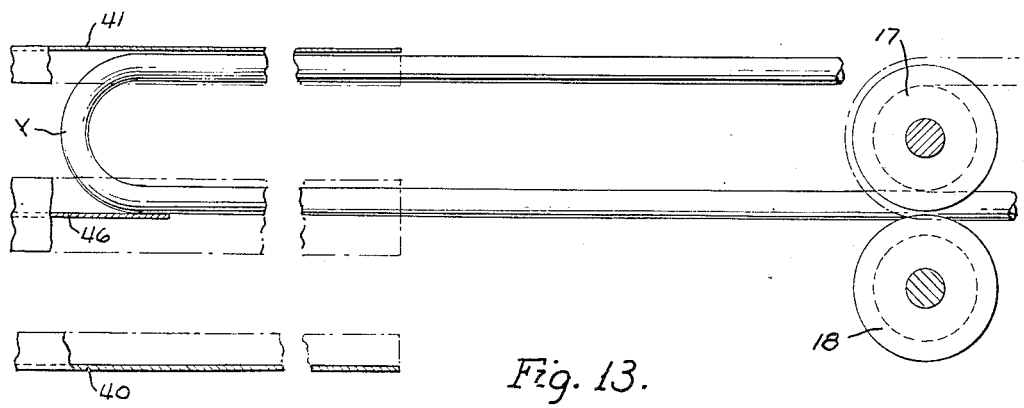
Fig. 13 is a diagrammatic view showing the advancement of the tube into the sweep.

One bend has now been made. At this time the sweep is elevated by the action of the piston rod 81 and the bending head, together with the sweep, move counter-clockwise from the Fig. 19 position back to the rest position shown in Fig. 17. The pivotal elevation of the sweep permits the sweep to move over the coil of tube resting upon the work table, as illustrated in dotted lines in Fig. 17. It is necessary that the sweep be quickly indexed in the rest position shown in Fig. 17 so that it is in proper alignment when lowered. This is the purpose of the additional spring arrangement 100. When the parts are swung back from the Fig. 19 position to the Fig. 17 position, the sweep is elevated and the additional spring pressure strongly holds the arms 75 and 76 against the ball formations 78 to centralize the sweep. At this time the sweep is lowered against the work table and the tubing is advanced. The leading part of the tube is the bight portion of the bend just made, and as it moves forwardly it is guided and engaged by the guide 41 and the central T shaped guide 46 as shown in Fig. 13. Due to the fact that the portion of the tube between the rollers 17 and 18 is on a centerline the guide 46 may oscillate slightly to the left as Fig. 12 is viewed. As the bight portion reaches and strikes the arm 31, the feeding motion is stopped and now the bending head and the sweep are oscillated counter-clockwise from the Fig. 17 position to the Fig. 18 position. Here again there is a lost play movement permitting the bending rolls to move through an angular displacement until such time as the arm 75 picks up and forces similar movement of the sweep. This is the same movement as demonstrated in Figs. 14 and 15 but in the reverse direction. This movement continues until stoppage by the sliding stop 111 striking the fixed stop 112 (Fig. 18). At this time the piston rod 81 is elevated so as to raise the sweep and the bending head and sweep move back from the Fig. 18 position to the rest position shown in Fig. 17. The additional spring pressure afforded by the spring mechanism 100 is again active to centralize the sweep and then the same is lowered for another advancement of the tube. The tube is now advanced and this time the bight portion of the bend just completed is the leading part of it and it passes between angle guide 40 and the central guide 46. Accordingly, the central guide 46 may swing somewhat to the right, as Fig. 12 is viewed, to accommodate the portion of the coil being guided thereby. The first run of tube made by the first bending action will advance on the opposite side of the angle guide 40.

This completes one sequence of operation and the operation continues with the serpentine coil building up with more and more bends and as to the same increases in size, the same is supported by the outer guide members 37 and 38, it being understood that these guides alternately function depending upon which side of the centerline the formed coil is lying. It is when the coil is built up to pretty good size that the guiding and supporting is particularly necessary, since the action is fast in order to get adequate production, all as above described.

The stopping action is preferably facilitated by a frictional braking action attained by the brake band 84 on the disc brake member 83. Normally, the brake band rotates freely with the disc 83 but as the end of each bending movement is reached, the lug 85 and the lug 86, depending upon which way the machine is moving, strikes the abutment 88. This stops the movement of the brake band and applies frictional resistance to continued movement of the disc 83. Thus, the oscillating movement of the sweep is frictionally decelerated before it comes to rest by engaging the fixed stops 112 and 113.

I claim:

1. An apparatus for shaping stock of elongated form, such as tubing, into coils of serpentine form having a succession of reverse bends, comprising bending means alternately operable to form reverse bends in the stock, means for advancing the stock between the alternate operations, a fixed support about the bending means upon which the formed coil portions are moved in opposite directions as successive bends are made, and a sweep mechanism movable over the support and with the bending means in its alternate operations for engaging the formed coil portions as it is moved to support said coil portions against distortion.

2. An apparatus for shaping stock of elongated form, such as tubing, into coils of serpentine form having a succession of reverse bends, comprising bending means alternately operable to form reverse bends in the stock, means for advancing the stock between the alternate operations, a support upon which the formed coil portions are moved in opposite directions as successive bends are made, a sweep mechanism movable with the bending means in its alternate operations for engaging the formed coil portions as it is moved to support said coil portions against distortion, and means for elevating the sweep mechanism for movement thereof independently of movement of the formed coil portions to a position for receiving the formed coil portions as the same advances with the advancing of the stock.

3. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a fixed support about the bending means upon which the formed coil portions are swung first in one direction and then the other direction as the bending means performs its alternate bending operations, and a sweep mechanism movable over the support and with the bending means in its alternate operations for engaging the formed coil portions as it is moved to support said coil portions against distortion.

4. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, a sweep mechanism movable with the bending means in its alternate operations for engaging the formed coil portions to support said coil portions against distortion, and means for elevating the sweep mechanism above the formed coil portions after each bending operation for movement of the sweep mechanism with the bending means as the bending means moves back to rest position.

5. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, a sweep mechanism for engaging the formed coil portions to support said coil portions against distortion as the same is swung in the operation of the bending means, and driving means connecting the bending means and sweep mechanism embodying a yieldable lost play connection for initial movement of the bending means in taking a purchase on the stock prior to movement of the sweep mechanism.

6. An apparatus for shaping stock of elongated form, such as tubing, into coils of serpentine form having a succession of reverse bends comprising, bending means having a rest position and alternately operable from the rest position in opposite directions to form reverse bends in the stock, means for adancing the stock between the alternate operations while the bending means is in the rest position, a support upon which the formed coil portions are swung first in one direction and then the other direction as the bending means performs its alternate bending operations, a sweep mechanism for engaging the formed coil portions to support said coil portions against distortion as the same is swung in the operation of the bending means, driving means connecting the bending means and sweep mechanism embodying a yieldable lost play connection for initial movement of the bending means in taking a purchase on the stock prior to movement of the sweep mechanism. means for elevating the sweep mechanism above the coil portions for movement thereof with the bending means back to rest position, and means rendered effective upon said elevation for applying centralizing force on the sweep mechanism to substantially locate the same in the rest position, said means for elevating the sweep mechanism being operable to lower the same in its rest position for the receiving of the coil portions upon the advancement of the stock.

7. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, a sweep mechanism for engaging the formed coil portions to support said portions against distortion as the coil portions are swung in the alternate operations of the bending means, yieldable driving means interconnecting the bending means and the sweep mechanism which yields to provide initial movement of the bending means from the rest position without movement of the sweep mechanism in which movement the bending means shifts to a position to start bending the stock, means for elevating the sweep mechanism after a bend has been made for movement thereof with the bending means back to the rest position, and additional yielding means rendered effective when the sweep mechanism is elevated to aid in bringing the sweep mechanism to a centralized position when the bending means stops at the at rest position, said elevating means being operable to lower the sweep mechanism into operable position when the bending means is at the rest position for receiving the coil portions as the stock is advanced.

8. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, a sweep mechanism movable with the bending means in its alternate operations for engaging the formed coil portions to support said coil portions against distortion, friction brake means effective upon the sweep mechanism as the same approaches the end of a sweeping motion for decelerating the sweeping motion, and a positive stop engageable by the sweep mechanism for limiting the movement of the same.

9. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, and a sweep mechanism movable with the bending means in its alternate operations for engaging the formed coil portions to support said coil portions against distortion, and stop means engageable by the sweep mechanism and including a slidably mounted stop member positioned between two fixedly mounted stop members so that the position of the sweep mechanism at the end of its movement following one bending operation overlaps the position of the sweep mechanism at the end of its movement following the next preceding bending operation.

10. In an apparatus for shaping stock of elongated form, such as tubing, into coils of serpentine form having a succession of reverse bends, each of substantially 180°, comprising, mechanism operable in a rotary fashion from a position of rest in one direction for making a bend in the stock and alternately operable in a rotary fashion from said position of rest in the opposite direction for making the next successive bend in the stock, and stop means for said mechanism, including a support, a stop member slidably mounted on the support and engageable, by said mechanism, first on one side and then on the other, as the mechanism makes its alternate movements, and fixed stop elements spaced relative to each other and between which the stop member is mounted for limiting the movement of the stop member, whereby said mechanism is moved through an excess of 180° in each alternate movement.

11. An apparatus for shaping stock of elongated form, such as tubing, into coils of serpentine form having a succession of reverse bends comprising, bending means having a rest position and alternately operable form the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, said bending means requiring an angular movement from the rest position before a purchase is attained on the stock to start bending the same, a sweep mechanism for engaging the formed coil portions to support the coil portions against distortion, means mounting the sweep mechanism on the bending means arranged to provide relative movement between the bending means and sweep mechanism, a driving member mounted on the bending means, and yieldable means interconnecting the driving member and the sweep mechanism and arranged to yield for movement of the bending means prior to attaining a purchase on the stock independently of movement of the sweep mechanism.

12. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means perfoims its alternate bending operations, said bending means requiring an angular movement from the rest position before a purchase is attained on the stock to start bending the same, a sweep mechanism rockably mounted on the bending means, a member fixedly secured to the bending means, a slidable element mounted on the said member having oppositely extending arms for engaging the sweep mechanism, and spring means mounted on the member and urging the said element in a direction so that its arms engage the sweep mechanism to cause movement of the sweep mechanism with movement of the bending means, said spring means yielding to provide movement of the bending means to attain a purchase on the stock independently of movement of the sweep mechanism.

13. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, said bending means requiring an angular movement from the rest position before a purchase is attained on the stock to start bending the same, a sweep mechanism for engaging the formed coil portions to support the coil portions against distortion, means rockably mounting the sweep mechanism on the bending means, said sweep mechanism having a pair of oppositely disposed projections, a driving member secured to the bending means, an element slidably mounted on the driving member, said element having a pair of arms extending therefrom and adapted to detachably engage the projections, spring means acting on the element to yieldably urge said arms into engagement with said projections, said spring means yielding so that one arm may move away from a projection with the initial movement of the bending means to attain a purchase on the stock, whereby said initial movement of the bending means is made independent of movement of the sweep mechanism.

14. An apparatus for shaping stock of elongated form, such as tubing, into coils of serpentine form having a succession of reverse bends comprising, bending means having a rest position and alternately operable from the rest position in opposite directions to form reverse bends in the stock, means for advancing the stock between the alternate operations while the bending means is in the rest position, a support upon which the formed coil portions are swung first in one direction and then the other direction as the bending means performs its alternate bending operations, said bending means requiring an angular movement from the rest position before a purchase is attained on the stock to start bending the same, a sweep mechanism rockably mounted on the bending means, a member fixedly secured to the bending means, a slidable element mounted on the said member having oppositely extending arms for engaging the sweep mechanism, spring means mounted on the member and urging the said element in a direction so that its arms engage the sweep mechanism to cause movement of the sweep mechanism with movement of the bending means, said spring means yielding to provide movement of the bending means to attain a purchase on the stock independently of movement of the sweep mechanism, means for pivotally connecting the sweep mechanism on its rockable mounting, and means operable to raise and lower the sweep mechanism on the pivotal connection for movement of the sweep mechanism with the bending means back to rest position independently of movement of the formed coil portions.

ARTHUR W. PAYNE.

REFERENCES CITED

The following references are of record in the file of this patent:

UNITED STATES PATENTS

| Number | Name | Date |
|---|---|---|
| 235,538 | Kilmer | Dec. 14, 1880 |
| 468,301 | Cooper | Feb. 2, 1892 |
| 679,433 | Sisson | July 30, 1901 |
| 932,191 | Trosiener | Aug. 24, 1909 |
| 957,200 | Gail | May 10, 1910 |
| 958,290 | Plant | May 17, 1910 |
| 1,372,816 | Holmgreen | Mar. 29, 1921 |
| 1,428,387 | Meyers | Sept. 5, 1922 |
| 1,531,498 | Peirce | Mar. 31, 1925 |
| 1,546,147 | Skinner | July 14, 1925 |
| 1,873,939 | Mason | Aug. 23, 1932 |
| 2,126,235 | Wesley | Aug. 9, 1938 |
| 2,331,294 | Bank | Oct. 12, 1943 |

FOREIGN PATENTS

| Number | Country | Date |
|---|---|---|
| 19,521 | Great Britain | Oct. 31, 1900 |
| 229,203 | Germany | Dec. 3, 1910 |
| 508,444 | France | July 24, 1920 |